Dec. 5, 1933.     G. O. STRATTON     1,937,854
AUXILIARY SPRING BUMPER FOR VEHICLES
Original Filed Nov. 12, 1931     2 Sheets-Sheet 1

INVENTOR.
George O. Stratton

BY Lancaster, Allwine and Rommel
ATTORNEYS.

Dec. 5, 1933.    G. O. STRATTON    1,937,854
AUXILIARY SPRING BUMPER FOR VEHICLES
Original Filed Nov. 12, 1931    2 Sheets-Sheet 2
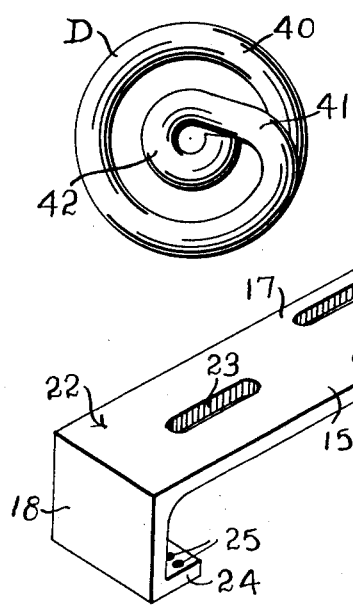
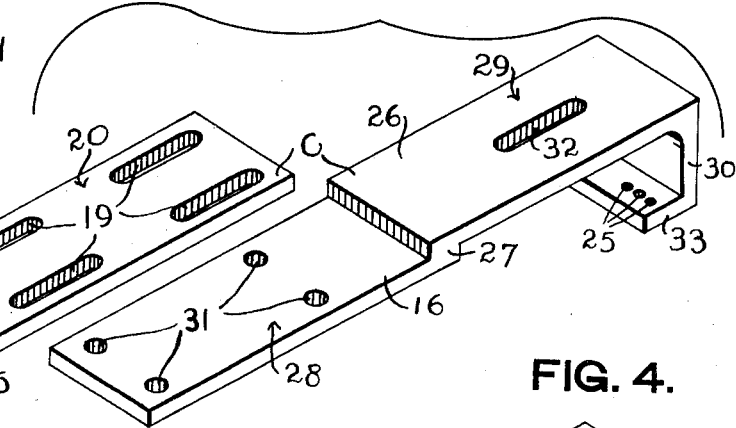
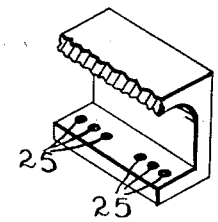
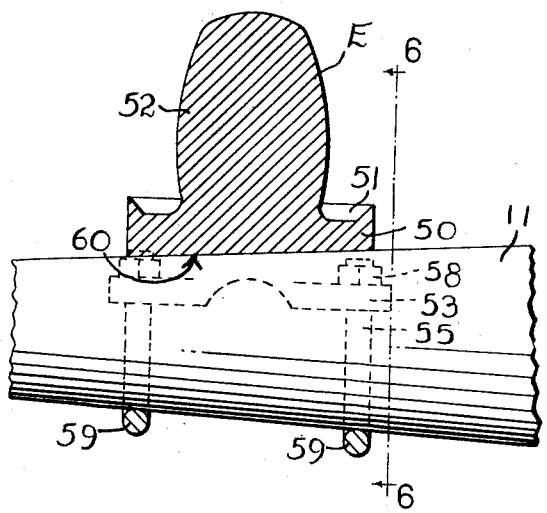
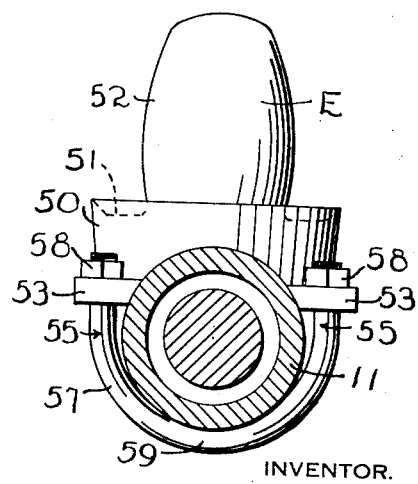
INVENTOR.
George O. Stratton
BY
Lancaster, Allwine and Rommel
ATTORNEYS.

Patented Dec. 5, 1933

1,937,854

UNITED STATES PATENT OFFICE 1,937,854

AUXILIARY SPRING BUMPER FOR VEHICLES

George O. Stratton, Antigo, Wis.

Application November 12, 1931, Serial No. 574,602. Renewed April 26, 1933

6 Claims. (Cl. 267—28)

This invention relates to auxiliary springs for vehicles and more particularly to an auxiliary spring assembly adapted to be carried by the chassis and axle housing of vehicles of varying widths, for supplementing the ordinary vehicle spring and preventing damage resulting from overloading, bad roads, and the like.

Modern motor vehicles, particularly motor trucks, vary in width of chassis. For example, a certain make of light motor truck is provided with side frame members which are either thirty-four or thirty-six inches apart. Not only do different models of a given make vary in this particular, but makes differ from each other in the same way. An auxiliary spring assembly which is adapted to be attached to the side frame members of the chassis of a certain make might not be applicable to the side frame members of a chassis of a different make. In addition it is sometimes inconvenient if not impossible to seat the auxiliary springs at certain points along the axle housing of certain makes of vehicles.

The principal object of this invention is to provide an improved adjustable auxiliary spring assembly for motor vehicles, adapted to be attached to vehicles of varying widths of chassis.

Another object of the invention is to provide an improved auxiliary spring assembly which is attached to the channelled side frame members of the chassis and to the axle housing of motor vehicles.

Still another object is to provide an improved adjustable auxiliary spring assembly adapted to bear against the axle housing, which permits the auxiliary springs to be adjusted to convenient positions along the housing.

A further object is to provide an improved assembly of this kind which may be easily and adjustably attached to the chassis and axle housing of a motor vehicle, without removing any parts of the chassis and housing, and simply by drilling several holes in the side frame members of the chassis.

Another object is to provide an improved auxiliary spring assembly which will tend to limit side sway of motor vehicles.

Other objects and advantages will be apparent during the course of the following detailed description taken in connection with the accompanying drawings forming a part of this specification and in which drawings:—

Figure 3 is a perspective view of two sections forming a cross bar employed in the assembly.

Figure 4 is a fragmentary perspective view of an end of either section of the cross bar.

Figure 5 is a view partly in vertical section showing a spring guide and stool forming a part of the improved auxiliary spring assembly.

Figure 6 is a view on the line 6—6 of Figure 5.

Figure 7 is a top plan view of a spring forming part of the assembly.

Figure 1:
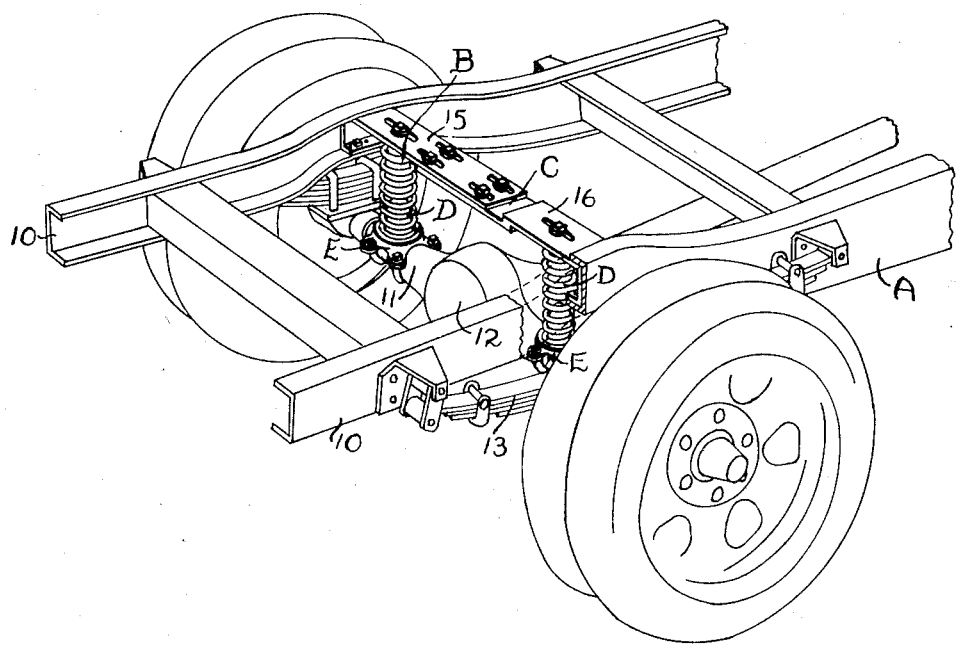
Figure 1 is a perspective view of the rear portion of a truck chassis and axle housing with the improved auxiliary spring assembly installed.

In the accompanying drawings forming a part of this specification and in which drawings similar reference characters designate corresponding parts thruout the several views, A designates a motor vehicle, B the improved auxiliary spring assembly which comprises a cross bar C, springs D and spring stools and guides E.

The motor vehicle illustrated is a conventional truck and includes longitudinally extending channelled side frame members 10, an axle housing 11, differential housing 12 and vehicle springs 13.

The improved auxiliary spring assembly B is preferably constructed of metal parts and requires but a few holes drilled in the flanged or other portion of the channelled side frame members 10, to attach it to a motor vehicle.

As for the cross bar C, this comprises two elongated overlapping sections 15 and 16, the section 15 including a body member 17 and a U-shaped bracket member 18 at its free end. The body member 17 is provided with a plurality of longitudinally extending slots 19 (preferably four of them) adjacent its side edges and included within the end portion 20 which may be designated as the overlapping end portion. At the opposite or bracketed end 22 of the body portion is a longitudinal slot 23 on the longitudinal medial line of the body member. The free end 24 of the bracket member 18 is preferably provided with two groups of three spaced perforations 25 as shown in Figure 4. This body member 17 is preferably in length somewhat over one-half the greatest distance between the side frame members of the motor vehicle. As for the elongated overlapping section 16, this includes a body member 26 the same being stepped at 27 as shown in Figure 3 forming an overlapping end portion 28 and a bracketed portion 29. A substantially U-shaped bracket member 30 similar to the bracket member 18, terminates the bracketed portion 29 of the body member 26. A plurality of perforations 31 (preferably four of them) are provided in the overlapping end portion 28, these corresponding in position to the slots 19. At the opposite or bracketed end portion 29 is a longitudinal slot 32 on the longitudinal medial line of the body member 26. The free end 33 of the bracket 30 is perforated similarly to the bracket member 18 as shown in Figure 4. The section 16 is preferably of a length somewhat greater than the section 15. When the two sections 15 and 16 are placed in overlapping relation a part of the portion 20 will overlap a part of the portion 28 and provide a smooth upper surface to the cross bar. Bolts 35 together with washers 36 and 37 and nuts 38 are preferably employed to adjustably join the sections 15 and 16 together to form the cross bar. The slots 19 provide for longitudinal adjustment of the cross bar to chassis of different widths. It is preferred to secure the cross bar sections to the side frame members 10 by drilling holes in the lower flange portion of the channeled side frame members 10 and riveting or bolting the sections as at 39 in Figure 2.

The pair of springs D are preferably expansion coil springs with body portions 40, upper or cross bar abutting ends 41 which terminate in eyes 42 and lower or stool abutting ends 43. These springs are adjustably secured to the cross bar which forms abutments for the ends 41 of the springs, by means of bolts 44 extending thru the slots 23 and 32 and to the eyes 42 of the springs, washers 45 and 46 together with nuts 47 being provided for that purpose.

Figure 2:
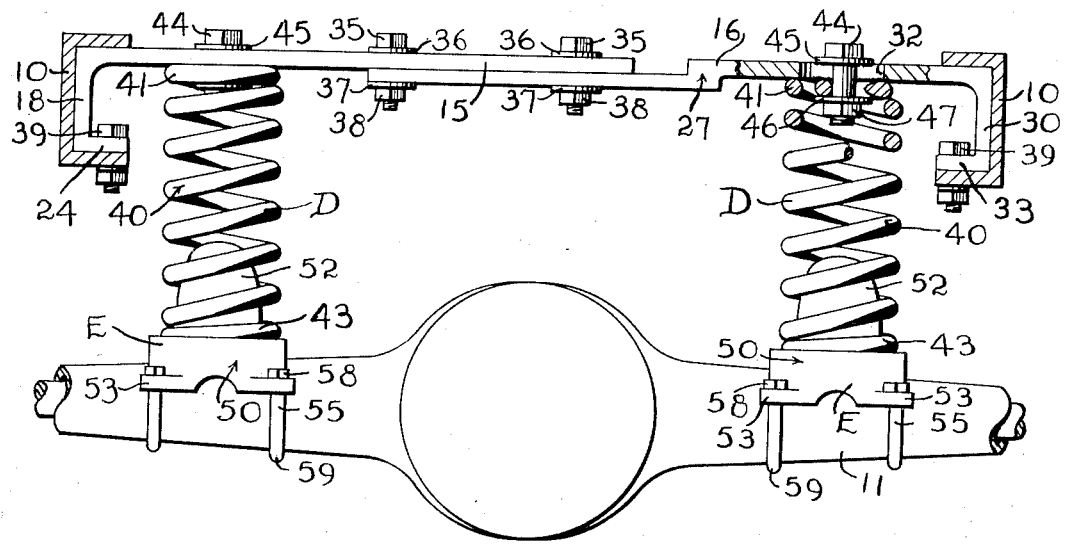
Figure 2 is a side elevation of the improved auxiliary spring assembly with portions broken away in order to show details of construction.

The spring stools and guides E include body portions 50 which fit upon the axle housing and are provided in their upper surfaces with circular recesses or grooves 51 having beveled side walls into which the ends 43 of the springs D seat. Dome-shaped guides 52 extend upwardly from the inner walls of the recesses 51 and are encircled by the springs D as shown in Figure 2. Flanges or ears 53 extend outwardly from two opposite sides of each body portion 50 and into these ears the screw threaded legs 55 of yokes 57 are inserted and secured by nuts 58 or the like while the bight portions 59 of the yokes pass around the lower surface of the axle housing. So that the spring stools and guides will firmly seat upon the axle housing, a recess or groove 60 is provided in the body portion 50. Since most axle housings are tubular and tapering, it is preferred that this recess be arcuate and tapering as shown in Figure 5. It will be apparent that the spring stool and guide may be adjusted along the axle housing or placed upon housings of other cross section by the use of appropriate shims (not shown) between the walls of the recess 60 and the axle housing.

In the attachment of the assembly to a motor vehicle, after the holes are drilled in the side frame members 10, the spring stools and guides E are temporarily secured to the axle housing at either side of the differential housing 12 with the springs D extending upwardly from the stools and guides E. The sections 15 and 16 of the cross bar C are now loosely attached to each other and extended or contracted so that the bracket members 18 and 30 are within the channels of the side frame members 10 as shown in Figure 2 and secured thereto. The nuts 38 may now be tightened and the spring stools and guides moved along the axle housing into the best location thereon and when this is discovered they are firmly attached. The nuts 47 are then tightened to secure the upper ends of the springs and the assembly is in readiness for use.

From the above it will be seen that an auxiliary spring assembly has been provided which is adapted to be adjusted to different makes and models of vehicles; which presents a sturdy abutment surface for the springs since the cross bar is connected directly to the chassis side frame members, which is placed above and not below or partly below the axle, and is therefore removed from the road surface on which the vehicle will travel, and yet permits in its construction the employment of comparatively long springs.

Changes in details may be made to the form of invention herein shown and described, without departing from the spirit of the invention or the scope of the following claims.

What is claimed is:

1. In an auxiliary spring assembly for vehicles provided with side frame members spaced varying distances apart and each vehicle provided with an axle housing, an adjustable combined cross bar and brace bridging the side frame members and secured thereto, forming a spring abutment facing the axle housing, and a spring disposed between the cross bar and axle housing with an end abutting said cross bar.

2. In an auxiliary spring assembly for vehicles provided with side frame members and each vehicle provided with an axle housing, a combined frame brace and cross bar bridging the side frame members and secured thereto, forming a spring abutment facing the axle housing, and a spring disposed between the cross bar and the axle housing with an end abutting said cross bar.

3. In an auxiliary spring assembly for vehicles provided with side frame members spaced varying distances apart and each vehicle provided with an axle housing, an adjustable cross bar bridging the side frame members and forming a spring abutment facing the axle housing, comprising two overlapping sections one provided with a slot and the other with a hole in the overlapped portion, means extending thru said slot and hole securing said sections together in adjustable relation, means securing the free ends of said sections to said side frame members, and a spring between the cross bar and the axle housing with an end abutting said cross bar.

4. In an auxiliary spring assembly for vehicles provided with channelled side frame members spaced varying distances apart, with the channels facing each other and each vehicle also provided with an axle housing, a combined cross bar and brace between the side frame members, comprising two overlapping sections each provided at their free ends with a substantially U-shaped bracket fitting within the channels, and a spring secured at one end to the cross bar and at the other end to the axle housing.

5. In an auxiliary spring assembly for vehicles provided with channelled side frame members spaced varying distances apart with the channels facing each other and each vehicle also provided with an axle housing, a longitudinally adjustable combined cross bar and brace bridging the side frame members, comprising two overlapping sections each provided at their free ends with a bracket fitting snugly within the channels, and a spring secured at one end to the cross bar and at the other end to the axle housing.

6. In an auxiliary spring assembly for vehicles provided with channelled side frame members spaced varying distances apart, with the channels facing each other and each vehicle also provided with an axle housing, a longitudinally adjustable cross bar bridging the side frame members, comprising two overlapping sections each provided at their free end with a substantially U-shaped bracket fitting within the channels, a spring secured at one end to the cross bar and at the other end to the axle housing, and means securing the bracketed portions of said cross bar to the channelled side frame members.

GEORGE O. STRATTON.